(No Model.) 2 Sheets—Sheet 1.

C. J. VAN DEPOELE.
ELECTRIC CURRENT METER.

No. 325,225. Patented Aug. 25, 1885.

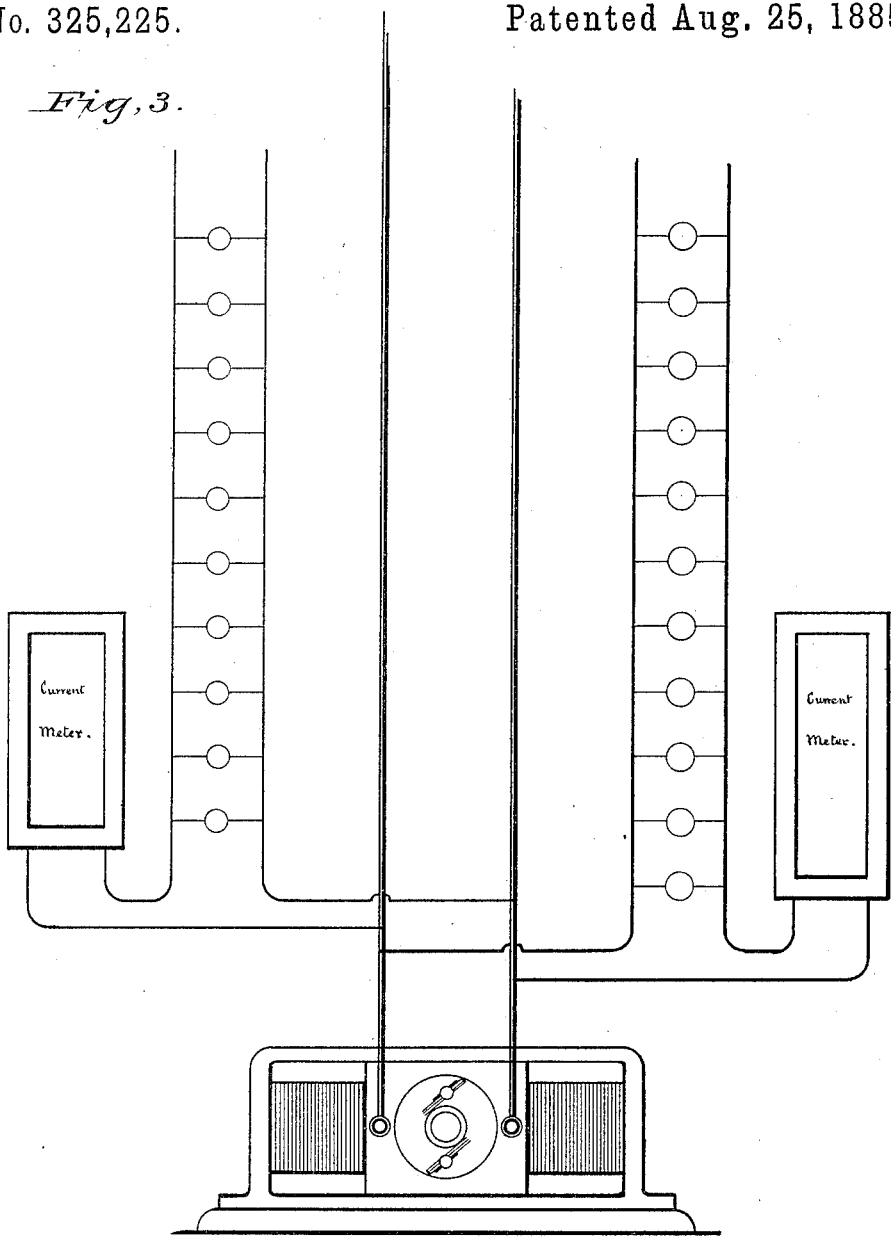

UNITED STATES PATENT OFFICE.

CHARLES J. VAN DEPOELE, OF CHICAGO, ILLINOIS.

ELECTRIC-CURRENT METER.

SPECIFICATION forming part of Letters Patent No. 325,225, dated August 25, 1885.

Application filed June 11, 1885. (No model.)

*To all whom it may concern:*

Be it known that I, CHARLES J. VAN DEPOELE, a citizen of the United States, residing at Chicago, in the county of Cook and State of Illinois, have invented certain new and useful Improvements in Electric-Current Meters, of which the following is a specification, reference being had to the accompanying drawings.

My invention relates to a new and useful device for measuring electric energy, and is especially adapted for recording the amount of current used by consumers using electric lamps or other electrical apparatus or appliances, the current being furnished from central points and distributed in any of the known ways. The present device is to take the same place among consumers of the electric current as the gas-meter takes in the consumption of gas. The principle of this electric meter is based upon the decomposition of water, it being a well-known fact that water is decomposed by the electric current, and that the rapidity of decomposition depends upon the strength of current used.

The following is a description of the device, reference being had to the accompanying drawings.

Figure 1:
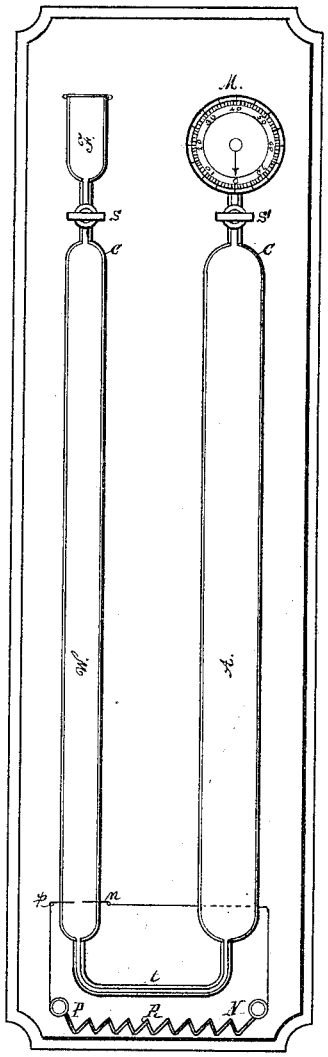
Figure 2:
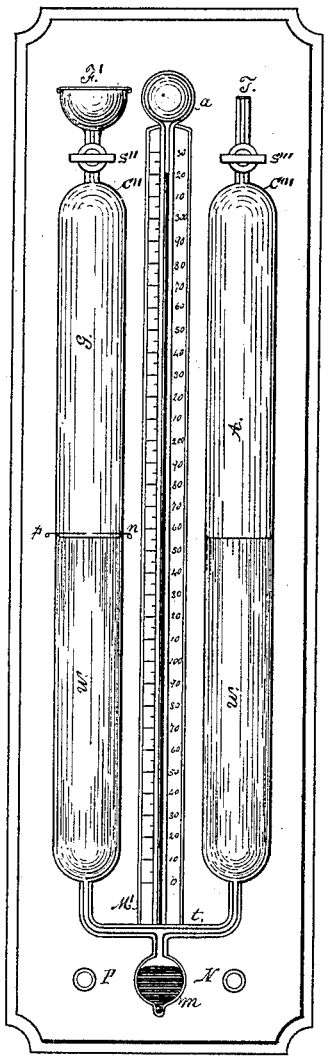

Figure 1 shows a current-meter complete, the readings being taken from the indicator M. Fig. 2 is a similar apparatus, the readings being taken from the manometric tube M'. Fig. 3 is a diagrammatic representation of the method of connecting the meter in circuit.

In the different figures similar letters denote like parts.

C C' C² C³ are glass cylinders. S S' S² S³ are glass stop-cocks to same.

F and F' are funnels by means of which the cylinders C and C² are filled with the electrolyte. $t\ t$ are connecting-tubes bringing the cylinders C C' and C² C³ into communication with each other. The cylinder C, Fig. 1, is filled with acidulated water, while the cylinder C' is filled with air, or any other elastic gas, as indicated by the letters W and A. In Fig. 2 the cylinders C² C³ are shown about half filled with acidulated water and air and water and gas, the water and air and water and gas being indicated by W and A and W and G, respectively. The positions of the materials in this figure are those assumed after continued service, as indicated by the condition of the register, which has almost reached its limit.

$p$ and $n$ are two platinum wires brought through the glass cylinders C C² and separated from one another by a space of, say, one-eighth inch, the outside free ends being in proper electrical contact with the poles P and N. Between P and N, as shown in Fig. 1, is placed a resistance, through which the main portion of the current to be measured is passed, only a small portion—say one-hundredth—passing through the electrolyte in the cylinder C by way of the platinum tips $p$ and $n$. In Fig. 2 this resistance is not shown, as it is supposed to be in the rear of the board where it really belongs so as not to affect the temperature in the different cylinders. The poles or binding-posts P and N are now put in circuit with the conductors through which the current to be measured is passing.

The apparatus is especially designed for measuring currents of constant electro-motive force, but of varying intensity, such as are used for incandescent lighting, &c., although it can be applied to any electric consumption circuit.

Having described the different parts of the invention, I will proceed to explain the apparatus as applied in practice.

The apparatus is preferably placed in a basement or other place where great change of temperature is not likely to occur. To fill the cylinder C, Fig. 1, with the electrolyte, open the stop-cock S and pour it in slowly until the tube is entirely filled, then close the stop-cock S and open the stop-cock S'. A portion of the current passes through the resistance R, and the remainder is thereby shunted through the electrolyte in cylinder C by way of the platinum tips $p$ and $n$, and will decompose the said electrolyte with more or less rapidity, according to its strength. When more current is passing through the resistance R, a larger proportion will also pass through the electrolyte, and vice versa. The gases—hydrogen and oxygen—evolved will rise to the top of the electrolyte in the cylinder C, and the gas will gradually displace the water or electrolyte contained therein, which latter will now be allowed to descend through tube $t$ into the cylinder $C'$, where the air will be gradually compressed thereby, and the pressure be indicated by the manometer or indicator M, so that the pressure can be read at any time, and by means of a prepared table the exact amount of current used since the last inspection can be ascertained.

The apparatus shown in Fig. 2 is somewhat different in construction, but works on the same principle as the one shown in Fig. 1 and above explained. As shown in Fig. 2, the electrolyte is standing at the same height in both the cylinders $C^2$ and $C^3$, and just below the platinum tips $p$ and $n$, which are connected electrically the same as those shown and described in Fig. 1. The manometer $M'$ in this case is a mercurial one, and indicates on a graduated scale the pressure in the tubes $C^2$ and $C^3$.

To prepare the apparatus by the introduction of the electrolyte, open the stop-cock $S^2$ and pour in gradually through funnel $F'$ until the tube $C^2$ is full. If, now, any of the electrolyte stands in the tube $C^3$, slip a rubber tube over the tube T, and, opening the stop-cock $S^3$, blow gently until the liquid in $C^3$ reaches the very bottom, when $C^3$ will be filled with air just enough compressed to send back the electrolyte in cylinder C. Now close the stop-cock $S^3$, and an initial pressure will be established. The mercury in the manometer $M'$ will have dropped into the bulb $m$, and will indicate zero. Now, on closing the stop-cock $S^2$, the apparatus is ready for use. On establishing the circuit with the source of electricity to be measured, the electrolyte will be decomposed with more or less rapidity, and the gases evolved will rise to the top of cylinder $C^2$, and allow the electrolyte to fall and rise in cylinder $C^3$, keeping the pressure in $C^2$ and $C^3$ equal. The manometer being in a branch from the two cylinders through the tube $t$, the downward pressure exerted upon the head of the mercury in the bulb $m$ by the pressure of the gases in the cylinders will cause the mercury to rise in the manometric tube $M'$, according to the amount of pressure in the cylinders $C^2$ and $C^3$.

In order to give freer action to the mercury in the manometric tube, the said tube is provided at its upper end with an air-bulb, $a$, by the use of which the pressure of the air above the mercury is practically equalized and the graduations on the scale do not vary as much as they would if the pressure upon the head of mercury were greater.

The proportions of the apparatus are such that in a case where, say, one hundred incandescent lights are used during a period of thirty days for sixteen hours per day the electrolyte would be only three-fourths, or thereabout, out of the tube above the platinum tips. It will be evident that the meters have to be made of such size as that the electrolyte will not be exhausted during the period of time the current consumed is to be measured. All the cylinders are closed from communication with the atmosphere. If this precaution were not taken, the indications of levels would be entirely false and unreliable, as the tubes would become barometric and would be influenced by the atmospheric pressure, which is ever changing, and consequently would alter the levels in the mercury as well as in the receiving-cylinders $C'$ $C^3$, and consequently the gas-cylinders $C'$ $C^2$. By thus excluding the atmospheric pressure from the tubes, I have produced a means of measuring with absolute perfection the amount of current used in the circuit in which the apparatus is placed, and by keeping the apparatus in a place where the temperature does not vary, say, more than from 50° to 60° above zero, (Fahrenheit,) the meter is absolutely correct.

In order to prevent tampering with the apparatus and to keep its temperature even, the whole can be inclosed in a wooden box provided with a cover of plate-glass. Thus the manometer can be read at any time by the consumer, but only opened by the authorized inspector of the company furnishing the current.

Instead of the manometer, as shown in Figs. 1 and 2, the graduations can be made upon the tubes $C'$ or $C^3$. I find in practice, however, that it is best to use the mercury manometer, as shown in Fig. 2. The indications are well defined, and nothing is liable to get out of order. Any mode of graduating the manometer may be used.

The electrolyte in the meters should be about one part sulphuric acid to nine parts water. The mixture should be made in bulk, and the specific gravity should be always the same, so that in the event of changing the electrolyte it should be of the same conductivity in all meters as in the standard instrument, after which all the others are graduated.

The conductivity of the electrolyte should be rendered standard before using. This can be done in any of the known ways. To graduate the standard meter a current of known strength should be passed through the electrolyte and the time and current required to produce a corresponding pressure in the cylinders as indicated by the manometer noted. When the standard is thus obtained, to graduate any meter afterward all that is necessary is to send a current through both meters, placing same either in series or in multiple arc, and as the decomposition proceeds and the pressure raises the mercury in the new meter, it should be marked to correspond with the standard, and so with all.

Instead of using the glass stop-cocks $S'$ $S^3$ to the air-cylinders, these can be entirely sealed on top, thus preventing all possible escape of air, the air inclosed therein by the electrolyte being sufficient to establish the initial pressure, although with well made stop-cocks there is no trouble whatsoever.

Any shape can be given to the cylinders containing either the electrolyte or the air to suit the convenience—as, for instance, instead of using the long and narrow cylinders, short ones of larger diameter can be used, thus enabling the whole to be put in a low, square box. The manometer should then be made to suit circumstances.

As is usual with electric meters, the reading can be taken, say, once a month. After the reading is taken the electrolyte is returned to the tube or cylinder C in the following manner: Open the stop-cock S slowly and allow the gases to escape into the air, while at the same time the electrolyte will rise to its former level. The stop-cock is then closed, and the apparatus is ready to take another month's indication. It will be understood that the indicator now stands at zero. A few drops of water may be added to the electrolyte, when, by the frequent emission of gas a noticeable quantity of the liquid is missing, but ordinarily I prefer to entirely renew the electrolyte with the standard solution whenever any considerable portion has been used.

What I claim as new, and desire to secure by Letters Patent, is—

1. An electric-current meter consisting, essentially, of hermetically closed chambers containing an electrolyte and electrodes for decomposing said electrolyte, in combination with an indicator acted upon by the gases produced by decomposition of the electrolyte and circuit connections, substantially as described, whereby the amount of current passing in a given circuit can be ascertained.

2. An electric-current meter consisting of two hermetically-closed cylinders or holders, one holding an electrolyte in proper electrical communication with two platinum electrodes passing from the outside to the inside of said holder, and connected to the source of electricity to be measured in the manner described, and the other holder containing air which will be compressed by the production of gas in the first holder during the decomposition of the electrolyte, said cylinders or holders being directly connected to a proper manometer, either mecurial or other, from which the pressure in the cylinders can be read, for the purpose set forth.

3. In an electric-current meter, two holders, the first containing an electrolyte, from which the gas is evolved under the action of the current to be measured, the second holder containing common air or any other elastic gas which can be compressed by the electrolyte, which is expelled from the first holder under the pressure of the gas formed in said holder, and a pressure-indicator properly connected to both holders, from which the pressure, and consequently the current used, can be read, substantially as described, and for the purpose set forth.

4. An electric-current meter consisting of a holder for an electrolyte, a holder containing air to be compressed by the expulsion into it of the electrolyte under the pressure of the gases resulting from the decomposition of the electrolyte, in combination with a mercurial or other manometer adapted to indicate the pressure of the air and gas in the above-named holders, the electrolyte, the air, gas, and mercury, all hermetically sealed against communication with the atmospheric pressure, all as described, and for the purpose set forth.

5. An electric-current meter consisting of a holder containing an electrolyte receiving current from a source of electricity to be measured, the electrolyte placed in a shunt-circuit from the source, allowing only a small portion of the current to traverse the electrolyte, in combination with a second holder containing air, connected to the first by means of proper tubing, enabling the electrolyte to be gradually expelled from the first holder as the production of gas goes on, thus compressing the air in the second holder, and a properly-attached pressure-indicator, showing the pressure in the hermetically-closed holders, substantially as described.

6. An electric-current meter consisting of an electrolyte contained in a hermetically-closed holder or holders, the electrolyte being placed in a shunt-circuit from the source of electricity to be measured, and proper means for giving room to the gas evolved from the electrolyte, in combination with a pressure-indicator showing the pressure produced by the evolution of gas from the electrolyte under the action of the current, for the purpose of determining the current consumed during a period of time in the circuit in which the meter is placed, substantially as described and set forth.

7. An electric current meter consisting of an electrolyte contained in a hermetically-closed holder or holders, the electrolyte being placed in a shunt-circuit from the source of electricity to be measured, the resistance of said shunt-circuit bearing a definite relation to that of the circuit from which it is derived, in combination with a pressure-indicator, showing the pressure produced by the evolution of gas from the electrolyte under the action of the current, for the purpose of ascertaining the amount of current consumed in the circuit in which the meter is placed, substantially as described and set forth.

In testimony whereof I affix my signature in presence of two witnesses.

CHARLES J. VAN DEPOELE.

Witnesses:
AARON K. STILES,
JOHN EASON.